United States Patent [19]

Snyder

[11] Patent Number: 4,941,378
[45] Date of Patent: Jul. 17, 1990

[54] METHOD AND APPARATUS FOR RAPID REPETITIVE CUTTING

[75] Inventor: George K. Snyder, Lockport, N.Y.

[73] Assignee: General Motors Corpooration, Detroit, Mich.

[21] Appl. No.: 261,307

[22] Filed: Oct. 24, 1988

[51] Int. Cl.⁵ .......................... B23D 21/04; B26D 1/28
[52] U.S. Cl. ......................................... 83/350; 83/262; 83/354
[58] Field of Search ................. 83/350, 647, 337, 303, 83/327, 308, 320, 328, 262, 216

[56] References Cited
U.S. PATENT DOCUMENTS
3,151,514 10/1964 Noveske ................................. 83/575

FOREIGN PATENT DOCUMENTS
0612755 6/1978 U.S.S.R. .............................. 83/647

Primary Examiner—Donald R. Schran
Attorney, Agent, or Firm—Ronald L. Phillips

[57] ABSTRACT

A continuously fed tube is momentarily halted at a cutting station and quickly cut by a rotating knife. The tube is continuously advanced from driving rollers to idler rollers and passes through interemdiate pinch rollers which are cam controlled in synchronism with the cutting process to bow the tube at a rate which causes the tube portion at the cutting station to briefly stop during cutting. The cutter includes a planetary gear set having a carrier rotatable about a central axis which carries a knife for rotation about another axis while it revolves about the central axis. The knife makes many rotations per carrier revolution but is in position to cut the tube during one of the rotations.

7 Claims, 2 Drawing Sheets

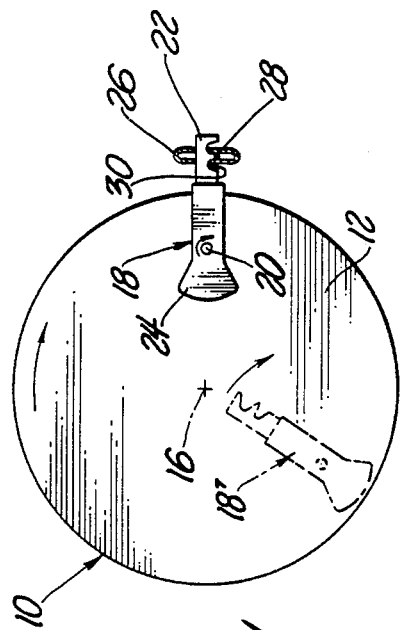
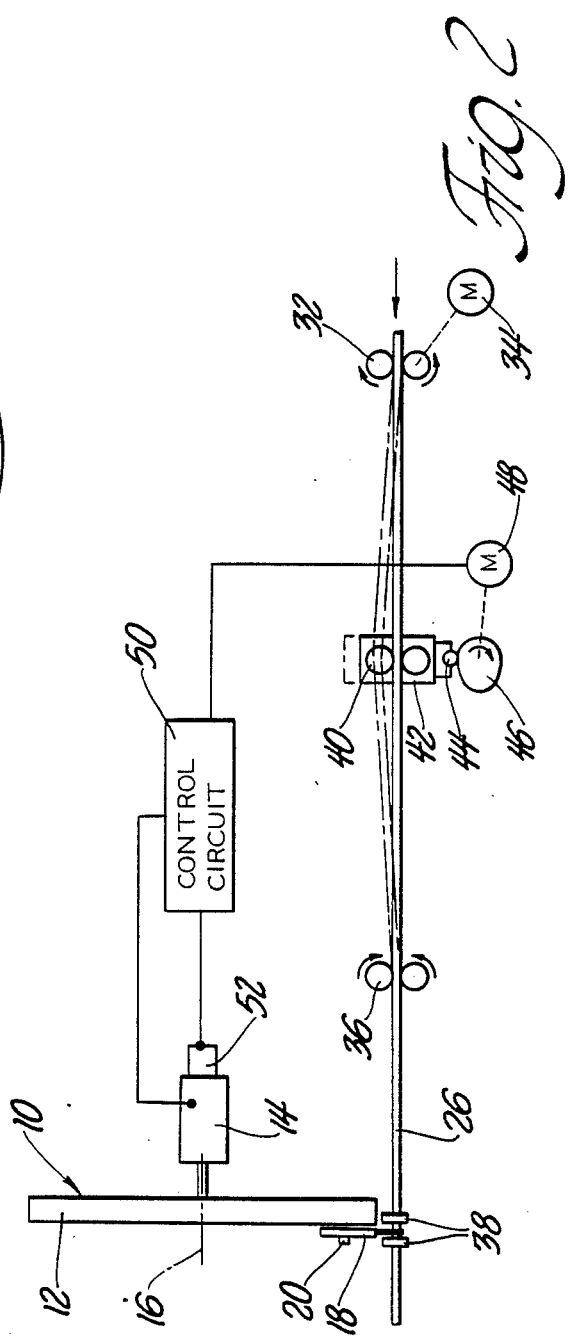

METHOD AND APPARATUS FOR RAPID REPETITIVE CUTTING

FIELD OF THE INVENTION

This invention relates to a rotating cutting knife and a cutting method and more particularly to a cutting knife and method especially adapted to cutting repetitively at a high rate.

BACKGROUND OF THE INVENTION

In the manufacture of tubing, a continuous tube is emitted from a tube mill at a high speed and the tube is cut into desired lengths as needed for specified usage or for convenient storage or shipping. The conventional cutting method uses a guillotine type cutter which chops the tube in a downward motion and is then retracted by an upward motion. In order not to interfere with the continuous advance of the tube, the knife, carried on a shuttle, moves in the direction of tube advance during cutting and retracting. Then the shuttle must return the knife to a start position for the next cut. Thus the alternating motion in two directions, forward and back motion of the shuttle and knife as well as up and down motion of the knife, is inefficient from the standpoint of overcoming inertia when reversing the movements. The inertia is substantial due to the considerable mass of the cutting mechanism. In addition, the time required for such cutting procedure places a limit on the production rate of the tubing.

It has been proposed to use a rotary knife motion for such purposes wherein a knife is moved in an arc during the cut and is then stopped and restarted in time for the next cut. In this case, the inertia of the knife must be overcome twice for each cut.

SUMMARY OF THE INVENTION

It is therefore an object of the invention to provide a method and apparatus for the cutting of an element such as tubing at a high rate. It is another object to provide such a method and apparatus for cutting which avoids the necessity of reversing the movements or the starting and stopping of the cutting mechanism.

The method of the invention is carried out by continuously rotating a knife about a knife rotation axis, moving the knife to the cutting site for one knife rotation for cutting an element and moving the knife away from the cutting site for a plurality of knife rotations by traversing the axis through a path at a rate requiring a plurality of knife rotations for each traverse of the path.

The invention is also carried out by a cutting mechanism comprising; rotary support means for rotation about a first axis, a knife mounted on the support for rotation about a second axis spaced from the first axis, a cutting site adjacent the support means and in the path of the knife for a given rotary position of the rotary support means, and motor means for driving the rotary support and the knife about respective axes, whereby the knife moves in a compound arcuate path which intersects the cutting site.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic side view of a cutter mechanism according to the invention, FIG. 2 is a schematic top view of the cutter of FIG. 1 and the tube feed and control mechanism.

DESCRIPTION OF THE PREFERRED EMBODIMENT

Figure 3:
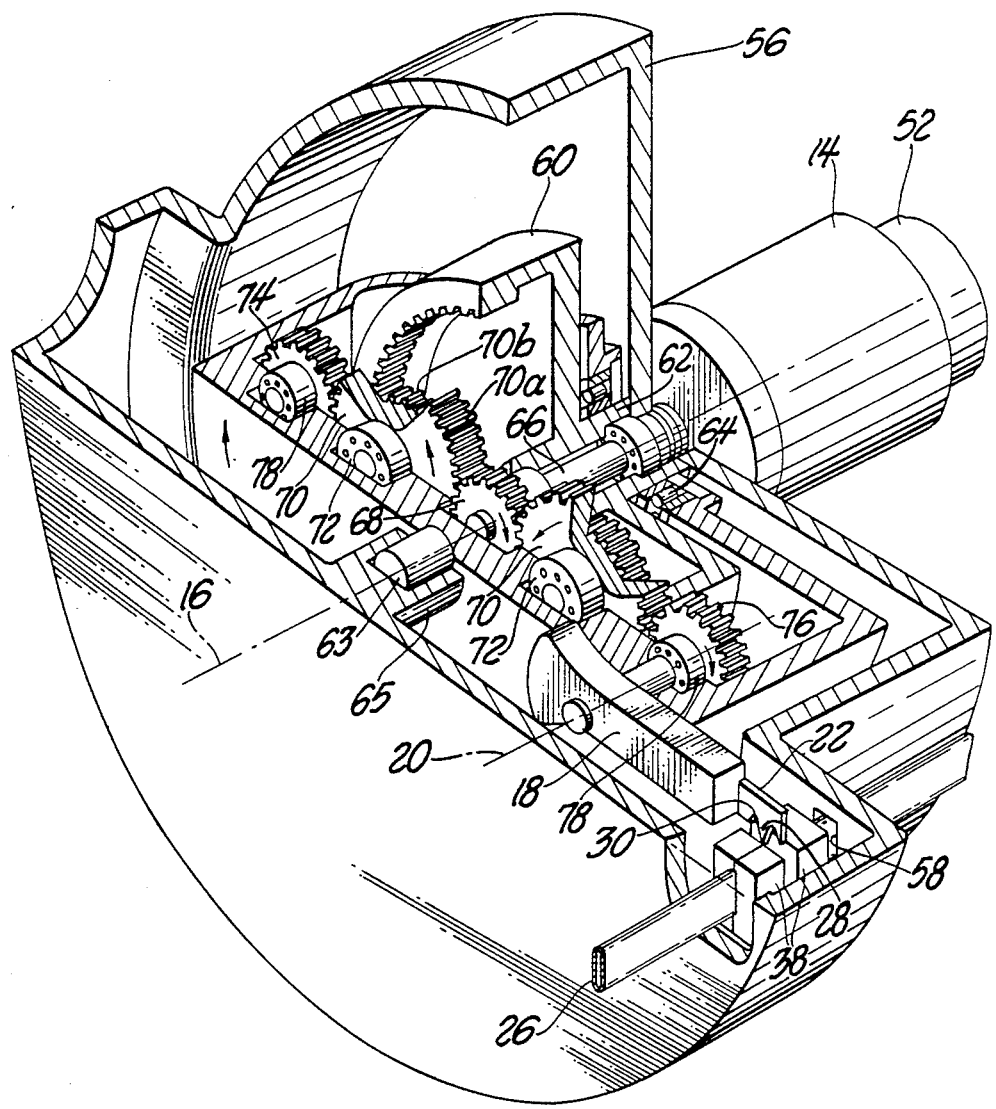
FIG. 3 is a partly broken away isometric view of the cutter mechanism of FIG. 1.

The method and apparatus of cutting an element by a rotating blade is especially designed for the cutting of tubing into prescribed lengths but it will be apparent that it also applies to the cutting of other elements.

Referring to the drawings, the cutter wheel 10 comprises a rotatable support 12 driven by a motor 14 for rotation about an axis 16. A knife 18 is pivotably mounted for rotation about an axis 20 and is rotatably driven by means to be described. The knife 18 is elongate and has a blade 22 at one end and a counterweight 24 at the other end. The blade 22 extends beyond the periphery of the support 12 when the knife is angularly disposed with the blade outward but the counterweight does not ever extend beyond the support. The tube 26 to be cut is shown in section in FIG. 1 and is a flat thin walled tube of metal such as aluminum which is readily cut by a single stroke of a rapidly moving blade. Preferably the blade is a well known structure called a Vogal knife which has a central cusp 28 for piercing the top of the tube and a curved concave blade portion 30 on either side of the cusp 28 for slicing through the side walls of the tube. The knife 18 is arranged to rotate about its axis 20 several times for each rotation of the support 12. An intermediate knife position is shown at 18'. The knife is in position to intersect the path of the tube 26 only once during each rotation of the support 12 and the successive knife rotations are idle, allowing time for the tube to advance to the next desired cut-off point.

The tube preferably originates from a tube mill, not shown, and advances at a constant preset speed. As shown in FIG. 2, the tube 26 is advanced by drive rollers 32, operated by a motor 34 and is guided toward the cutter station by idler rollers 36. The cutter station comprises the vicinity of the cutter wheel 10 and has two sets of die blocks 38 spaced on opposite sides of the path of the blade 22 for positioning and supporting the tube 26 during the cut. For the purpose of momentarily stopping the tube advance at the idler rollers and at the cutting station, a pair of pinch rollers 40 engage the tube midway between the drive rollers 32 and the idler rollers 36. The pinch rollers 40 are mounted on a slide 42 or the like for movement in a direction transverse to the tube advance movement. The slide 42 carries a cam follower 44 which is driven by a cam 46. The cam 46, in turn is rotated by a servomotor 48 controlled by a control circuit 50. The control circuit 50 also controls the motor 14 and has an input from a position encoder 52 on the motor 14 which reveals the cutter wheel position to the control circuit.

While the constant feed of the tube prevents stopping the tube altogether, transients can be introduced to the path of the tube to cause a momentary halt or hesitation of the tube at the idler rollers 36 without any disturbance to the constant feed at the drive rollers 32. By increasing the effective path length between the drive rollers and the idler rollers at the same rate as the tube feed, the tube advance at the idler rollers 36 is stopped for as long as the increase of path length can be sustained. Then if the path length is decreased to return the tube to the original path, the tube speed at the idler rollers will temporarily be higher than the normal speed. The cam, driven by the servomotor 48, is under control of the circuit 50 to rotate when the cutting action is about to take place thereby causing the pinch rollers 40 to bow the tube 26. The servomotor speed and the cam shape are calculated to effect the rate of displacement necessary to offset the advance during the increase of the path length so that the tube will be stationary at the cutting station for a brief time.

Typically the tube mill can be expected to produce tubing at a rate of 600 feet per minute. Assuming the tube is to be cut at 2 foot lengths, the wheel speed will be 300 rpm. For a distance of 10 inches between the two axes of rotation and a knife length of 6 inches from its axis to the cutting edge, the linear velocity component due to the wheel rotation will be 500 inches per second. If the knife rotates at 3000 rpm, that adds a velocity component of 1800 ips. If the tube height is 1⅜ inch and the blade height is 2 inches, the knife will be in contact with the tube for a cutting interval of 0.00143 seconds. During that time the tube advance would be 0.172 inch. For a separation of six feet between the rollers 32 and 36, a bowing displacement of about 2.5 inch is adequate to produce the increased path length.

The details of the cutting wheel are shown in FIG. 3. A planetary gear set is used to rotate the knife 18 about its own pivot axis 20 and to revolve the knife about the axis 16 of the support 12. The support 12 is the planetary carrier for the gear set. A fixed housing 55 has a first cylindrical portion 56 which encloses the cutter wheel 10 and a second cylindrical portion 57 of greater diameter than the first which has room for knife rotation and has ports 58 which permit the tube 26 to pass through the cutting station. A stationary internal ring gear 60 is secured to the housing by a hollow hub 62. The carrier or support 12 is hollow and contains all the gears of the planetary gear set. The carrier has a generally cylindrical shape and has a hub aperture 61 which is rotatably mounted by bearings 64 on the outer surface of the hub 62. For additional support, the carrier has an axle 63 extending opposite the bearings 64 which is journaled within a tubular boss 65 in the housing 55. A shaft 66 is journaled in the hollow hub 62 and is driven at its outer end by the motor 14 and carries a sun gear 68 at its inner end. A pair of intermediate gears 70 are rotatably mounted on the carrier 12 by bearings 72 and each gear 70 is compound, having a large diameter gear portion 70a which meshes with the sun gear and a small diameter gear portion 70b which meshes with the internal ring gear. A pair of outer pinions 74 and 76, also carried by bearings 78 on the carrier 12, mesh with the large diameter gear portion 70a. The pinion 76 is coupled by a shaft 78 to the knife 18 for supporting and rotating the knife.

In operation, the motor 14 drives the sun gear 68 which causes the intermediate gears 70 to turn within the fixed ring gear 60 to drive the carrier 12. The motor rotation direction is chosen to rotate the carrier 12 in the cutting direction at the cutting station. The pinion 76 and the knife are driven in the same direction so that all the forces join to move the knife 18 in the cutting direction. As the carrier makes a single revolution, the knife 18 makes many rotations, perhaps 10 or 15, depending on the gear ratios selected. During one rotation the knife will be positioned by the carrier 12 to cut the tube 26 and during all the other rotations the knife will not be in position to touch the tube. Since the housing is stationary and no part of the cutter wheel 10 moves in the direction of the tube motion, the blade of the knife 18 is restricted to movement within a fixed plane and the tube, which is temporarily halted, is cut in that plane.

The embodiments of the invention in which an exclusive property or privilege is claimed are defined as follows:

1. The method of cutting an element at a cutting site comprising the steps of;
    continuously rotating a knife through complete revolutions about a knife rotation axis,
    periodically moving the knife to the cutting site for one knife rotation for cutting the tube, and
    moving the knife away from the cutting site for a plurality of continuous complete knife rotations by traversing the axis through a path at a rate requiring a plurality of continuous complete knife rotations for each traverse of the path.

2. The invention as defined in claim 1 wherein the said path is a circle and the knife rotation axis revolves about an axis parallel to the knife rotation axis.

3. The method of cutting a tube at a cutting site comprising the steps of;
    positioning the tube at the cutting site,
    continuously rotating a knife through complete revolutions about an axis,
    cutting the tube by moving the rotating knife to the cutting site for a cutting interval,
    then advancing the tube for another cut while moving the rotating knife away from the cutting site for a plurality of complete knife rotations by traversing the axis through a curved path at a rate requiring a plurality of complete knife rotations for each traverse of the path, and
    synchronizing the tube advance with the movement of the knife from the cutting site, whereby successive tube cuts are made at selective complete rotations of the knife.

4. A cutting mechanism comprising;
    rotary support means for rotation about a first axis,
    a knife mounted on the support means for full revolution rotation about a second axis spaced from the first axis,
    a cutting site adjacent the support means and in the path of the knife for a given rotary position of the rotary support means, and
    motor means for continuously driving the rotary support and the knife through continuous complete revolutions about their respective axes, whereby the knife continuously moves sin a compound arcuate path which intersects the cutting site.

5. A tube cutting mechanism comprising;
    a planetary gear set including a rotary gear carrier for continuous rotation about a first axis,
    a knife mounted on the carrier for continuous rotation about a second axis spaced from the first axis and being continuously rotatably driven by the gear set,
    a cutting site adjacent the carrier and in the path of the knife for a given rotary position of the carrier, and
    motor means drivingly coupled to the planetary gear set for continuously driving the carrier and the knife through continuous complete revolutions about their respective axes, whereby the knife continuously moves in a compound arcuate path which intersects the cutting site.

6. The invention as defined in claim 5 wherein the planetary gear set comprises;
   a sun gear driven by said motor means,
   a stationary ring gear,
   at least one intermediate gear rotatably support by the carrier and meshing with the sun gear and the ring gear, and
   a pinion driven by the intermediate gear and supported by the carrier, the knife being fixed to the pinion for rotation therewith.

7. The invention as defined in claim 5 including a stationary housing containing the gear set and the knife, an opening in the housing for admitting a tube to be cut, and die blocks for guiding the tube through the opening and supporting the tube in the cutting site.

* * * * *